United States Patent
Hamrin

(10) Patent No.: US 10,253,881 B2
(45) Date of Patent: Apr. 9, 2019

(54) SYSTEMS AND METHODS FOR AXIAL FORCE GENERATION

(71) Applicant: Fallbrook Intellectual Property Company LLC, Cedar Park, TX (US)

(72) Inventor: John Hamrin, Bemidji, MN (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 67 days.

(21) Appl. No.: 15/161,033

(22) Filed: May 20, 2016

(65) Prior Publication Data

US 2017/0335961 A1 Nov. 23, 2017

(51) Int. Cl.
| | |
|---|---|
| F16H 15/52 | (2006.01) |
| F16H 63/06 | (2006.01) |
| F16H 61/664 | (2006.01) |
| F16H 13/08 | (2006.01) |
| F16H 13/14 | (2006.01) |
| F16H 15/50 | (2006.01) |
| F16H 15/28 | (2006.01) |

(52) U.S. Cl.
CPC .......... *F16H 63/067* (2013.01); *F16H 15/52* (2013.01); *F16H 61/6649* (2013.01); *F16H 13/08* (2013.01); *F16H 13/14* (2013.01); *F16H 15/28* (2013.01); *F16H 15/503* (2013.01)

(58) Field of Classification Search
CPC ........ F16H 63/067; F16H 15/52; F16H 13/08; F16H 13/14; F16H 15/503
USPC ................. 475/189, 195; 476/37, 41, 45, 65
See application file for complete search history.

(56) References Cited

U.S. PATENT DOCUMENTS

| | | | | |
|---|---|---|---|---|
| 4,314,485 | A | * | 2/1982 | Adams ................... G05D 13/34 476/10 |
| 5,209,703 | A | * | 5/1993 | Mastine ................ F16H 55/563 474/14 |
| 7,011,600 | B2 | | 3/2006 | Miller et al. |
| 7,036,620 | B2 | | 5/2006 | Miller et al. |
| 7,125,297 | B2 | | 10/2006 | Miller et al. |
| 7,166,056 | B2 | | 1/2007 | Miller et al. |
| 7,169,076 | B2 | | 1/2007 | Miller et al. |
| 7,198,585 | B2 | | 4/2007 | Miller et al. |
| 7,232,395 | B2 | | 6/2007 | Miller et al. |

(Continued)

FOREIGN PATENT DOCUMENTS

| | | |
|---|---|---|
| JP | 56-24252 | 3/1981 |
| JP | 2001-234999 | 8/2001 |

(Continued)

OTHER PUBLICATIONS

English translation of JP2001234999A; http://translationportal.epo.org; Mar. 23, 2018.*

(Continued)

*Primary Examiner* — Roger L Pang
(74) *Attorney, Agent, or Firm* — Knobbe Martens Olson & Bear LLP

(57) ABSTRACT

A speed based axial force generation mechanism may generate axial force corresponding to a rotational speed of a speed based axial force generation system relative to a central axis. As the speed based axial force generation system rotates at increasing speeds, inertia causes a change in the configuration of a first rigid member and a second rigid member, resulting in a change in the axial force generated by the mechanism.

9 Claims, 9 Drawing Sheets

(56) References Cited

U.S. PATENT DOCUMENTS

| | | |
|---|---|---|
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,250,018 B2 | 7/2007 | Miller et al. |
| 7,288,042 B2 | 10/2007 | Miller et al. |
| 7,322,901 B2 | 1/2008 | Miller et al. |
| 7,396,209 B2 | 7/2008 | Miller et al. |
| 7,651,437 B2 | 1/2010 | Miller et al. |
| 7,686,729 B2 | 3/2010 | Miller et al. |
| 7,727,108 B2 | 6/2010 | Miller et al. |
| 7,731,615 B2 | 6/2010 | Miller et al. |
| 8,066,614 B2 | 11/2011 | Miller et al. |
| 8,171,636 B2 * | 5/2012 | Smithson ............... F16H 15/28 29/893 |
| 8,267,829 B2 | 9/2012 | Miller et al. |
| 8,360,917 B2 | 1/2013 | Nichols et al. |
| 8,469,853 B2 | 6/2013 | Miller et al. |
| 8,628,443 B2 | 1/2014 | Miller et al. |
| 8,814,739 B1 * | 8/2014 | Hamrin ............... F16H 61/6645 475/189 |
| 8,888,643 B2 * | 11/2014 | Lohr ...................... F16H 15/50 475/189 |
| 8,956,262 B2 * | 2/2015 | Tomomatsu ........... F16H 15/40 476/38 |
| 9,228,644 B2 * | 1/2016 | Tsukamoto ........... F16H 55/563 |
| 2012/0214626 A1 * | 8/2012 | Cook ................. F16H 61/66245 474/14 |

FOREIGN PATENT DOCUMENTS

| | | |
|---|---|---|
| WO | WO 11/064572 | 6/2011 |
| WO | WO 13/042226 | 3/2013 |

OTHER PUBLICATIONS

International Search Report and Written Opinion dated Aug. 29, 2017 in PCT/US2017/032953.

* cited by examiner

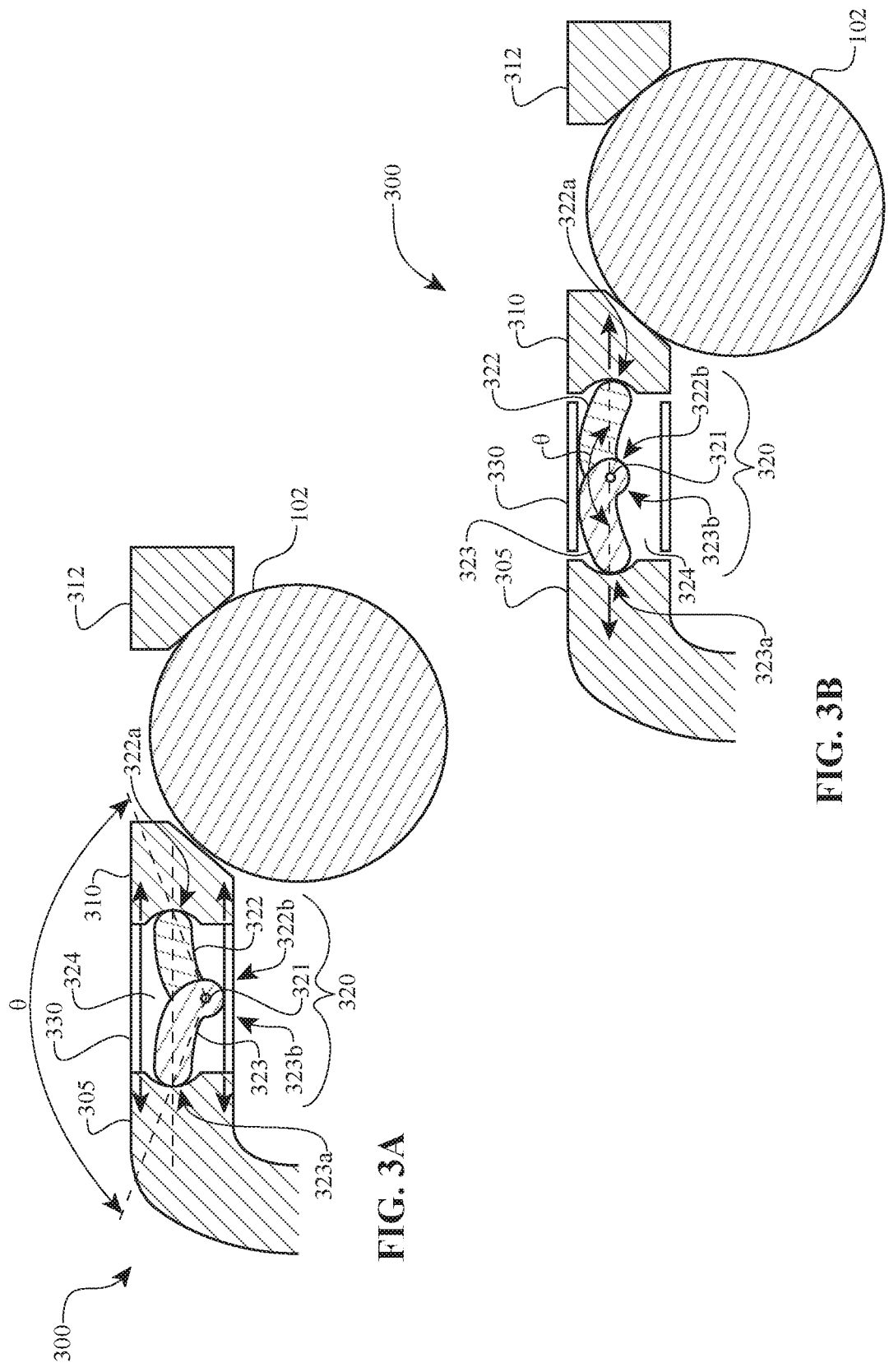

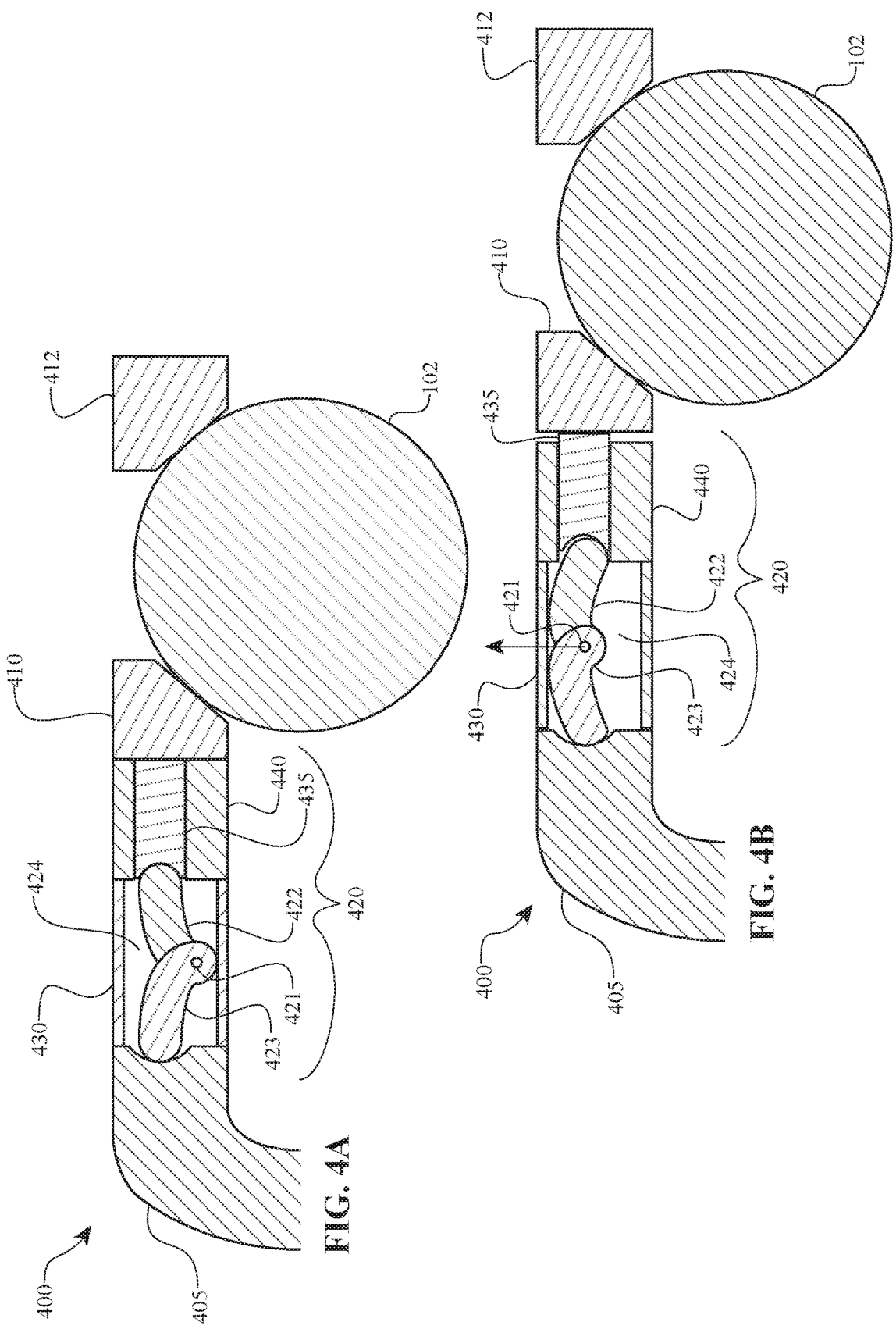

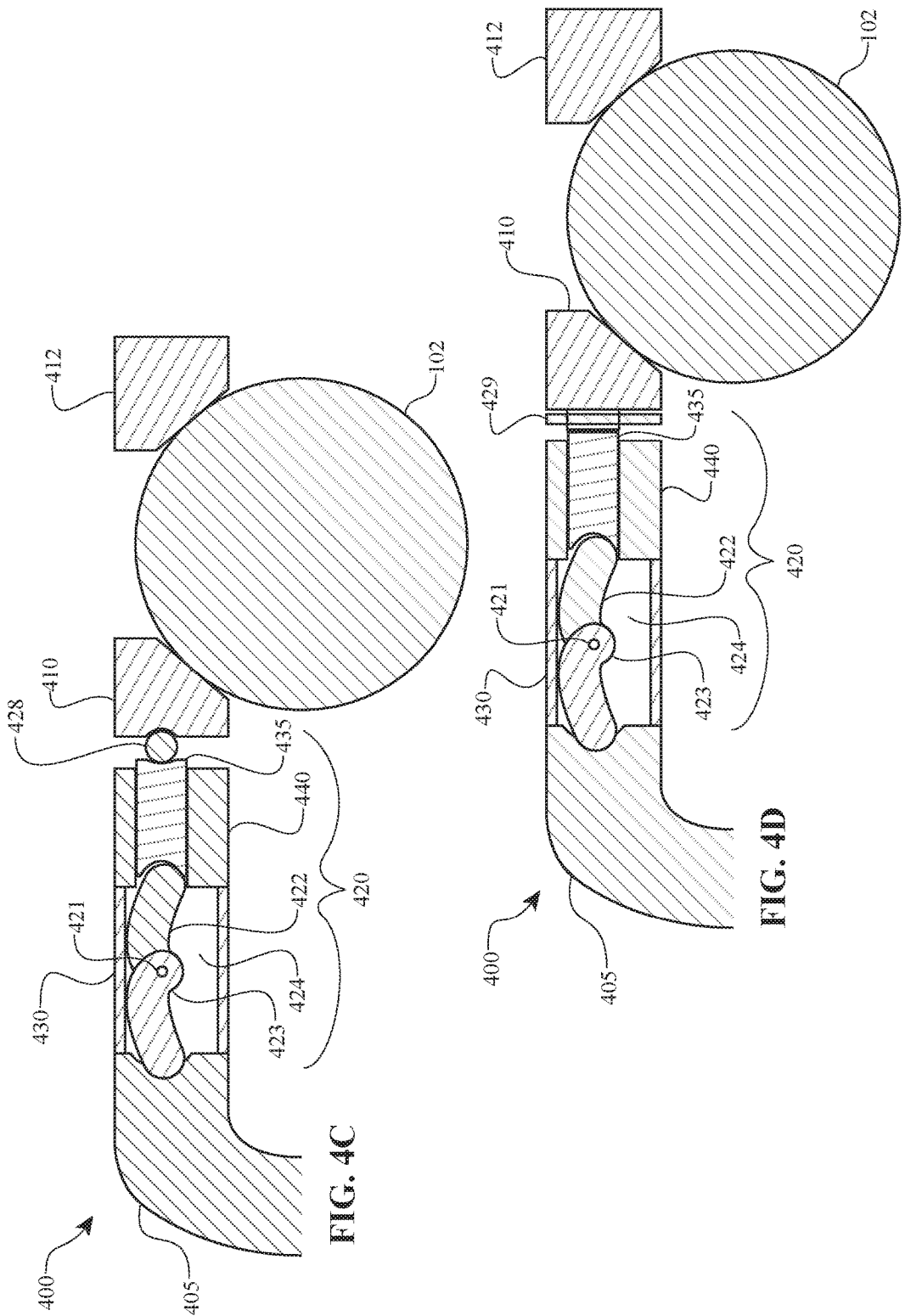

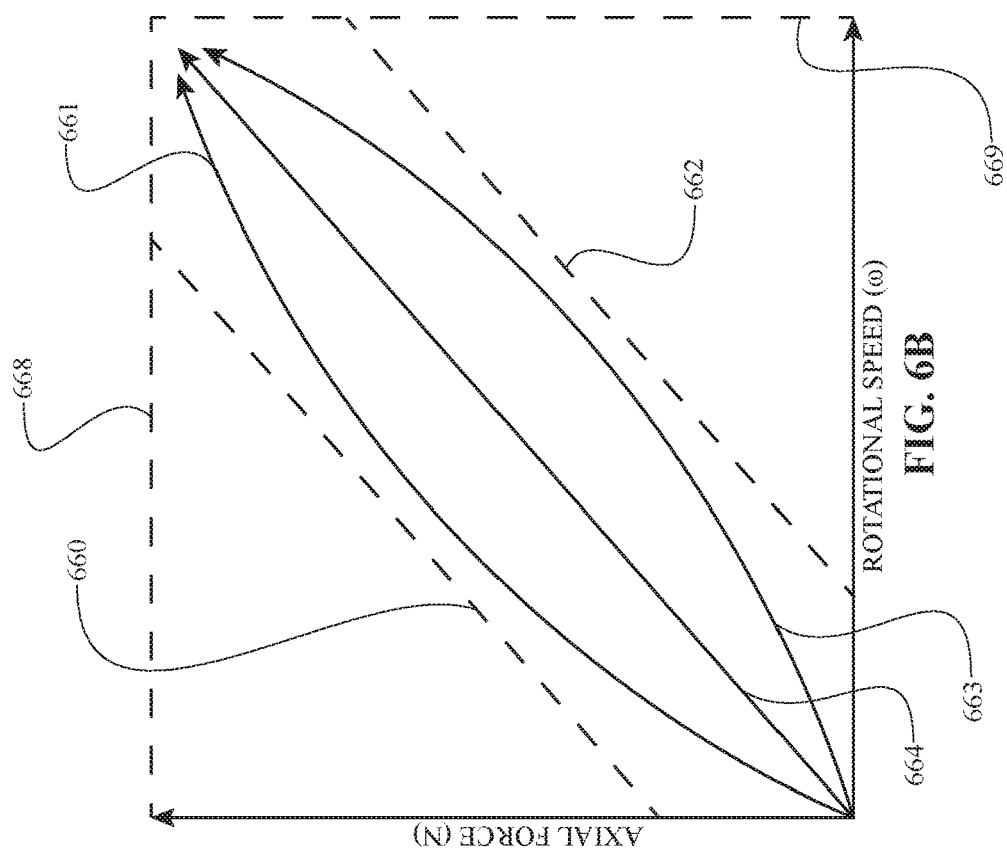
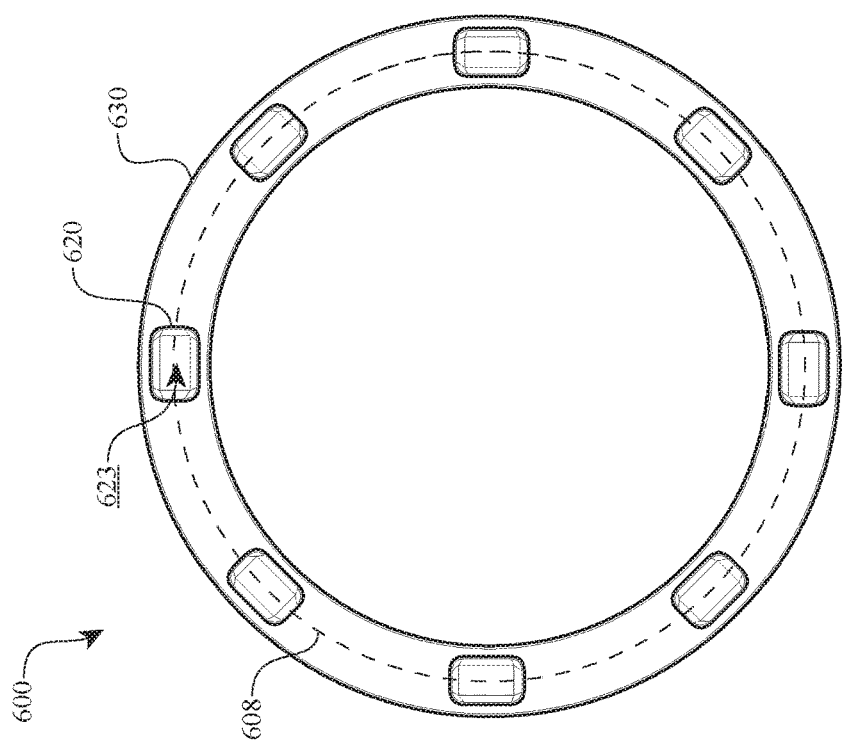
FIG. 6A
FIG. 6B

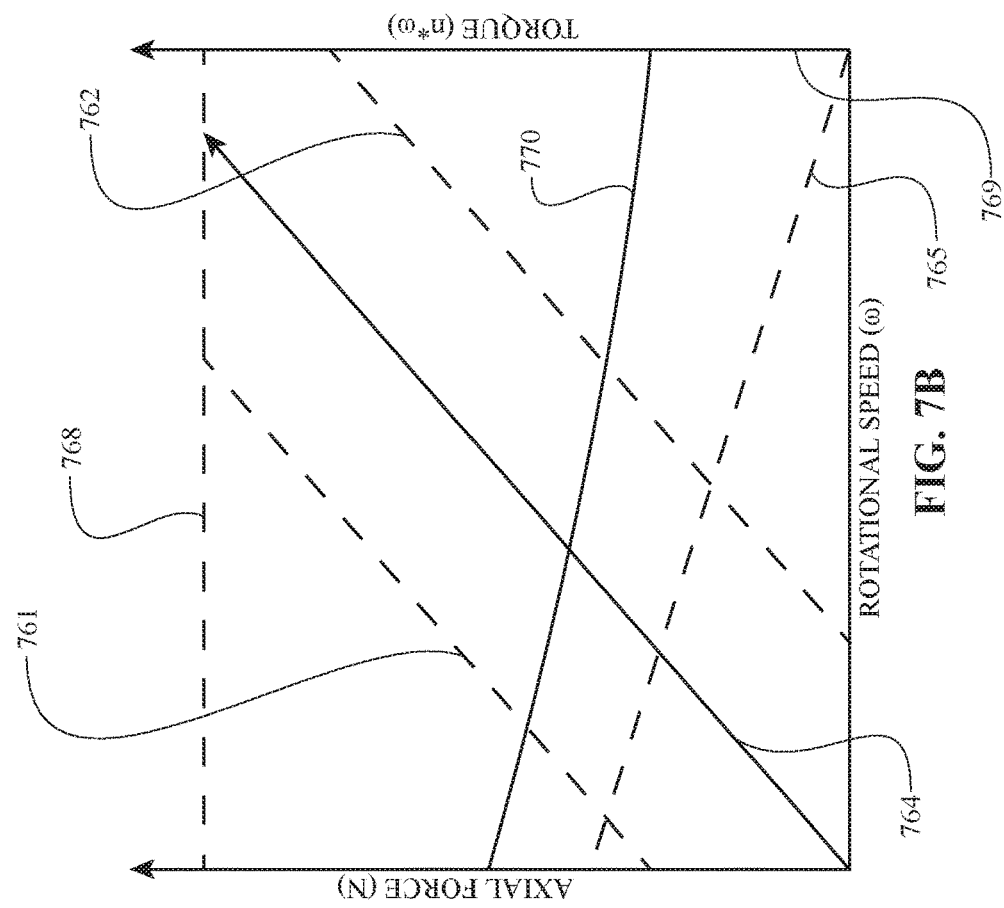
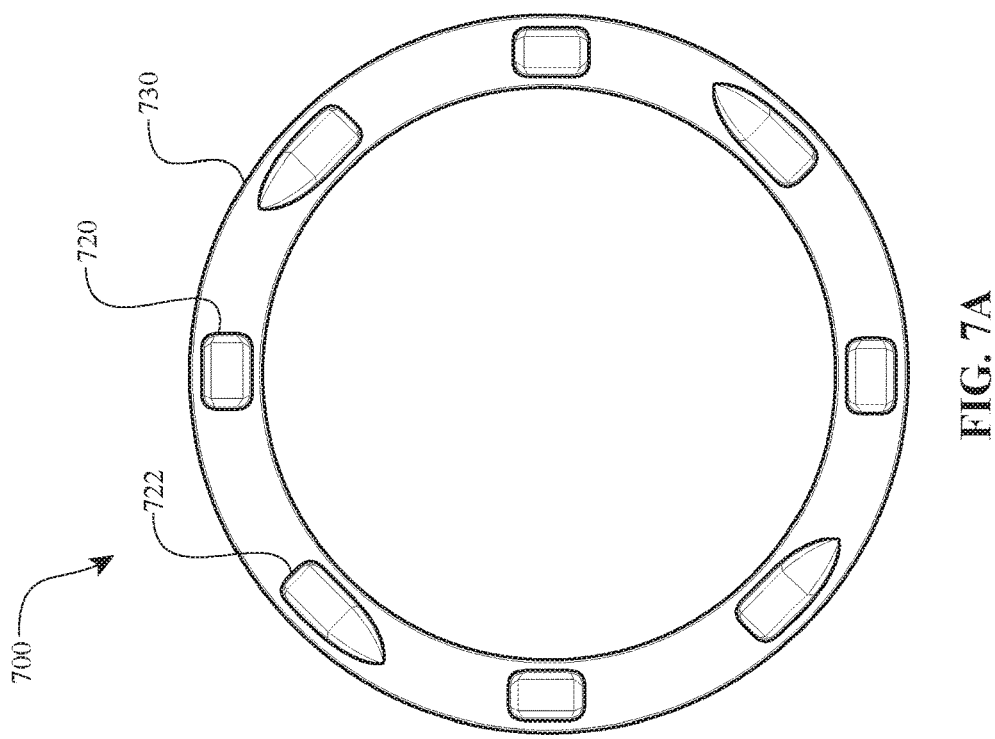
FIG. 7B
FIG. 7A

US 10,253,881 B2

SYSTEMS AND METHODS FOR AXIAL FORCE GENERATION

BACKGROUND

Field of the Disclosure

Embodiments disclosed herein relate generally to continuously variable transmissions (CVTs), including infinitely variable transmissions (IVTs). More particularly, embodiments relate to CVTs and their components, as well as subassemblies and systems which may generate an axial force independent of the features, available power paths, and configurations possible with a CVT.

Description of the Related Art

Continuously variable transmissions (CVTs) are being used ever more increasingly in systems in which shift shock, gear collisions, and other mechanical events are known to occur. CVTs such as those described in U.S. Pat. Nos. 7,011,600, 7,238,136, 7,198,585, 7,250,018, 7,166,056, 7,235,031, 7,169,076, 7,288,042, 7,396,209, 8,066,614, 7,731,615, 7,651,437, 7,727,108, 7,686,729, 8,267,829, 7,238,137, 7,036,620, 7,238,138, 7,232,395, 7,125,297, 8,469,853, 8,628,443 and 7,322,901 provide smooth acceleration and deceleration by eliminating the mechanical events previously associated with geared transmissions. Thus, there exists a continuing need for CVTs, both as independent systems and as subassemblies integrated with existing technologies, in a multitude of powered applications.

In ball planetary type CVTs, power may be transferred between components via a traction fluid. The use of a traction fluid avoids issues with geared transmissions. However, the operating speed, the power source, or the power load may cause slip or otherwise bias the CVT into an unwanted state in which slipping and other negative effects may occur.

SUMMARY

Embodiments illustrated and described herein have several features, no single one of which is solely responsible for its desirable attributes. Without limiting the scope as expressed by the description that follows, the more prominent features of embodiments disclosed will now be discussed briefly. After considering this discussion, those skilled in the art may appreciate how the features of the systems and methods provide several advantages over known systems and methods, and how these features may be extended to various configurations and systems not disclosed but still within the scope of the teaching.

In one broad respect, embodiments may be generally directed to a force generation mechanism comprising a first rigid member hingedly connected to a second rigid member, wherein the first rigid member and the second rigid member form a first angle when the axial force generation system is not exposed to a centripetal force. The axial force generation mechanism exerts an increase in centripetal force at higher rotational velocities, causing the first rigid member and the second rigid member to form a second angle. Embodiments may include a support structure configured to position a first end of the first rigid member in contact with a first ring and position a first end of the second rigid member in contact with a second ring opposite the first ring. In some embodiments, the support structure comprises a third rigid member, wherein the third rigid member provides a first axial force when the centripetal force is less than a predetermined value and wherein the first and second rigid members apply a second axial force when the centripetal force is greater than a predetermined value. In some embodiments, one or more of the length of the first rigid member, the length of the second rigid member, the mass of the first rigid member, the mass of the second rigid member, a profile of the first rigid member, and the profile of the second rigid member are selected to apply the second axial force according to a predetermined rate. In some embodiments, the generation rate of the second axial force increases linearly as the centripetal force increases. In some embodiments, the generation rate of the second axial force increases at a non-linear rate (e.g., increases at an increasing rate, increases at a decreasing rate, increases in steps, etc.).

In one broad respect, embodiments may be generally directed to a speed based axial force generation system comprising a first annular ring, a second annular ring, and a speed based axial force generation mechanism interposed between the first annular ring and the second annular ring. The axial force generation system is formed of a first rigid member hingedly connected to a second rigid member, the first rigid member having a first end shaped for contact with the first annular ring and the second rigid member having a first end shaped for contact with the second annular ring, wherein the first rigid member and the second rigid member form a first angle when the axial force generation mechanism is not exposed to a centripetal force. The speed based axial force generation mechanism experiences an increase in centripetal force at higher rotational velocities, causing the first rigid member and the second rigid member to translate or rotate to form a second angle, wherein an axial force is generated on the first annular ring and the second annular ring based on the second angle. In some embodiments, the second angle does not exceed 180 degrees. In some embodiments, the axial force generating system includes a support structure, the support structure having a third rigid member, wherein the third rigid member exerts a first axial force when the centripetal force is less than a first value and the speed based axial force generation mechanism exerts a second axial force when the centripetal force exceeds a second value. In some embodiments, the first value equals the second value. In some embodiments, the first value is greater than the second value, and the support structure provides the first axial force in parallel with the second axial force. In some embodiments, the first annular ring is integral with a traction ring. In some embodiments, the first annular ring is integral with a clamping mechanism. In some embodiments, the axial force generating system includes a third annular ring and a second speed based axial force generation mechanism interposed between the second annular ring and the third annular ring, wherein the first speed based axial force generation mechanism and the second speed based axial force generation mechanism are in series, wherein the first speed based axial force generation mechanism applies a first axial force over a first range of rotational speeds and the second speed based axial force generation mechanism applies a second axial force over a second range of rotational speeds. In some embodiments, one or more of the length of the first rigid member, the length of the second rigid member, the mass of the first rigid member, the mass of the second rigid member, a profile of the first rigid member, and a profile of the second rigid member are selected to apply an axial force according to a predetermined rate. In some embodiments, the generation rate of the second axial force increases linearly as the centripetal force increases. In some embodiments, the generation rate of the second axial force increases at a non-linear rate (e.g., increases at an increasing rate, increases at a decreasing rate, increases in steps, etc).

BRIEF DESCRIPTION OF THE DRAWINGS

The accompanying figures, which are incorporated in and form a part of the specification, illustrate certain features of the inventive embodiments.

FIGS. 2A-2B, 3A-3B, 4A-4D and 5 depict cross-sectional partial views of a CVT with embodiments of speed based axial force generating systems;

FIG. 6A depicts a top view of one embodiment of a speed based AFG system;

FIG. 6B depicts a graph, illustrating axial force (N) generated by a speed based axial force generation mechanisms versus rotational speed ($\omega$);

FIG. 7A depicts a view of one embodiment of an axial force generation system with speed based axial force generation mechanisms and torque based axial force generation mechanisms;

FIG. 7B depicts a graph, illustrating operation of an axial force generation system utilizing a combination of torque based axial force generation mechanisms and speed based axial force generation mechanisms.

DETAILED DESCRIPTION OF THE PREFERRED EMBODIMENTS

Figure 1:
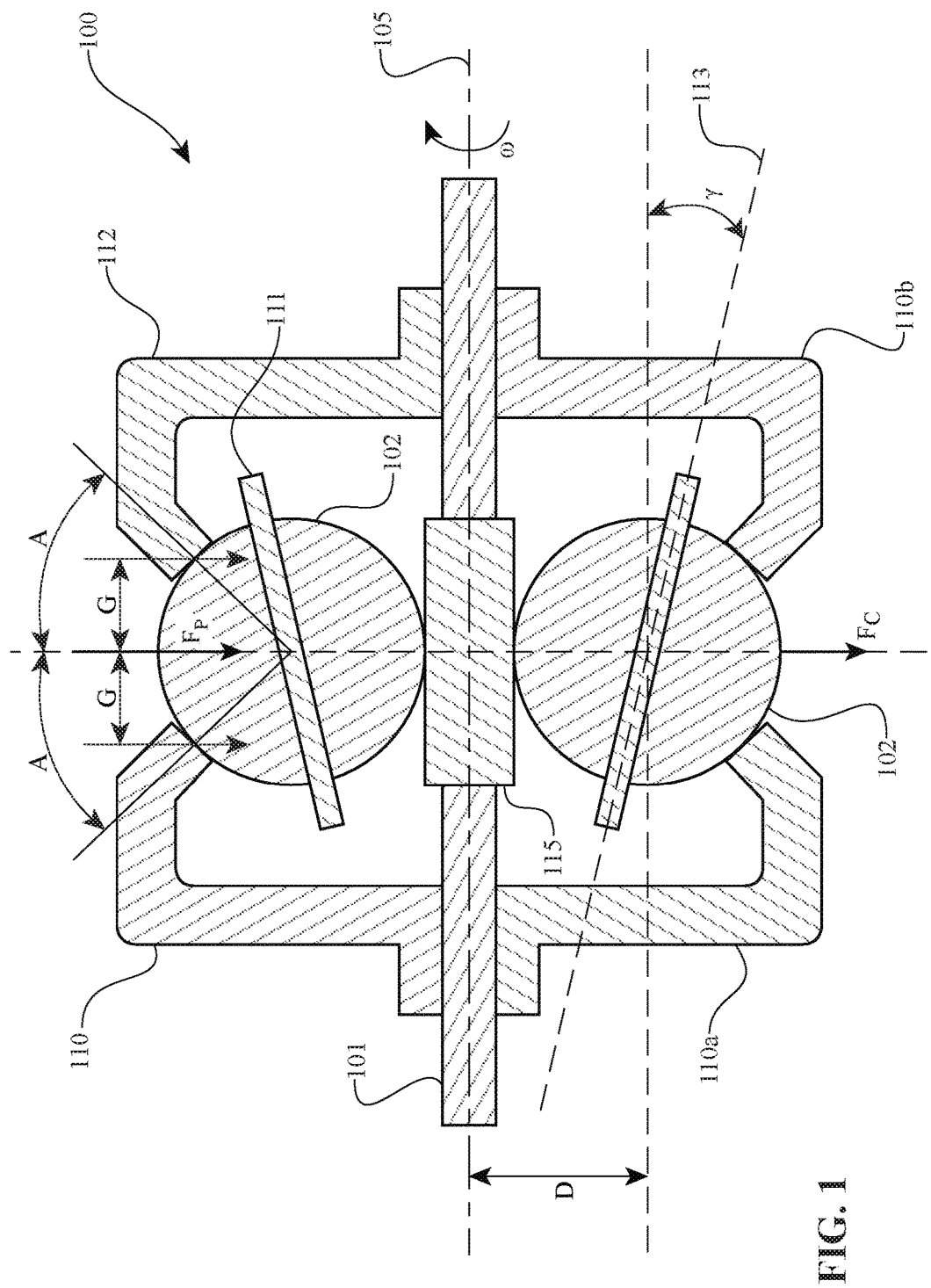
FIG. 1 depicts a cross-sectional partial view of a continuously variable transmission.

The preferred embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the terms indicate that the actual linkage or coupling may take a variety of forms, which in certain instances will be obvious to a person of ordinary skill in the technology. For description purposes, the term "radial" is used here to indicate a direction or position that is perpendicular relative to a longitudinal axis of a transmission or continuous variator. The term "axial" as used here refers to a direction or position along an axis that is parallel to a main or longitudinal axis of a transmission or continuous variator.

Unless otherwise explicitly stated, as used herein, the term "or" refers to an inclusive statement. In other words, the statement "A or B" is true if any of the following conditions are met: A is True and B is False; A is False and B is True; or A is True and B is True.

Certain inventive embodiments described below incorporate ball planet type variators that use planets, each of which typically has a tiltable axis of rotation. The planets are also known as speed adjusters, power adjusters, balls, planets, spheres, sphere gears or rollers. Usually, the planets are arrayed circumferentially in a plane perpendicular to a longitudinal axis of a CVT. Traction rings are positioned on each side of the array of planets, with each traction ring being in contact with the planets. A first traction ring applies input power having a first torque at an input rotational speed to the planets. As the planets rotate about their own axes, the planets transmit the power to a second traction ring at a second torque and an output rotational speed. The ratio of input rotational speed to output rotational speed ("speed ratio") is a function of the ratio of the radii of the contact points of the first and second traction rings, respectively, to the rotational axes of the planets. Tilting the axes of the planets with respect to the axis of the CVT adjusts the speed ratio of the variator.

FIG. 1 depicts a cross-sectional partial view of a continuously variable transmission. Continuously variable transmission 100 includes a plurality of planets 102 which collectively rotate about axle 101 defining central axis 105 and which individually rotate about axles 111 defining planet axes of rotation 113. Sun 115 is positioned radially inward of and in contact with planets 102, and may be rotated about central axis 105. Planets 102 are interposed between and in contact with traction rings 110, 112. In some embodiments, power may be transmitted through sun 115. As planets 102 rotate about central axis 105, power transmitted through sun 115 is transmitted to planets 102 to traction rings 110 and 112. In other embodiments sun 115 does not transmit power (and may be referred to as an idler). As power is transmitted via traction ring 110 or 112, power passes through planets 102 to the other traction ring 112 or 110. In any of these embodiments, by changing the angle (gamma) of axles 111 (and therefore axes of rotation 113), the speed ratio of traction ring 110 relative to traction ring 112 changes.

Embodiments may be useful in systems with rotating or non-rotating carriers. One concern of operating a CVT is the rotation of planets 102 results in a centrifugal force ($F_c$). This fictitious force is the result of inertia acting on planets 102. The centrifugal force depends upon the mass of planets 102, the distance (D) from the center of mass of planets 102 relative to central axis 105, and the rotational speed $\omega$ (omega) of CVT 100. The centrifugal force is counteracted by a reaction force (i.e., a centripetal force $F_p$). The centripetal force is applied by traction rings 110, 112 in contact with planets 102. However, traction rings 110, 112 are not in alignment with the centripetal force, but are instead offset by a gap (G) and the contact is also at some angle (A). As a result, contact between planets 102 and traction rings 110, 112 may provide a sufficient centripetal force to offset the centrifugal force, but an axial force is generated with the effect of biasing traction rings 110, 112 away from each other.

The generated axial separation force depends upon the centripetal force and the angle A. The generated axial separation force may also depend on the presence and properties of a traction fluid enabling contact between traction rings 110, 112 and planets 102, the material or properties of traction rings 110, 112, or other characteristics or properties of CVT 100. For example, depending on the material of traction rings 110, 112, temperature or vibration may affect how much deformation is possible. Other characteristics or properties may include hardness, durablility, ductility, the presence of any internal stresses, or complance in the system including the interaction between traction rings 110, 112 and other elements of CVT 100 including bearings or seals, etc.

Continuously variable transmissions disclosed herein can be used to offset axial separation forces or counteract axial separation by various elements. Embodiments may generate constant axial forces, may generate variable axial forces, or may generate some combination of constant or linear and variable axial forces. Axial forces may be generated in series or parallel.

A mechanism for generating axial forces in a continuously variable transmission may convert rotational speed into an axial force. FIGS. 2A-2B, 3A-3B, 4A-4D and 5 depict cross-sectional partial views of a CVT with embodiments of speed based axial force generation mechanisms.

Figures 2A, 2B:
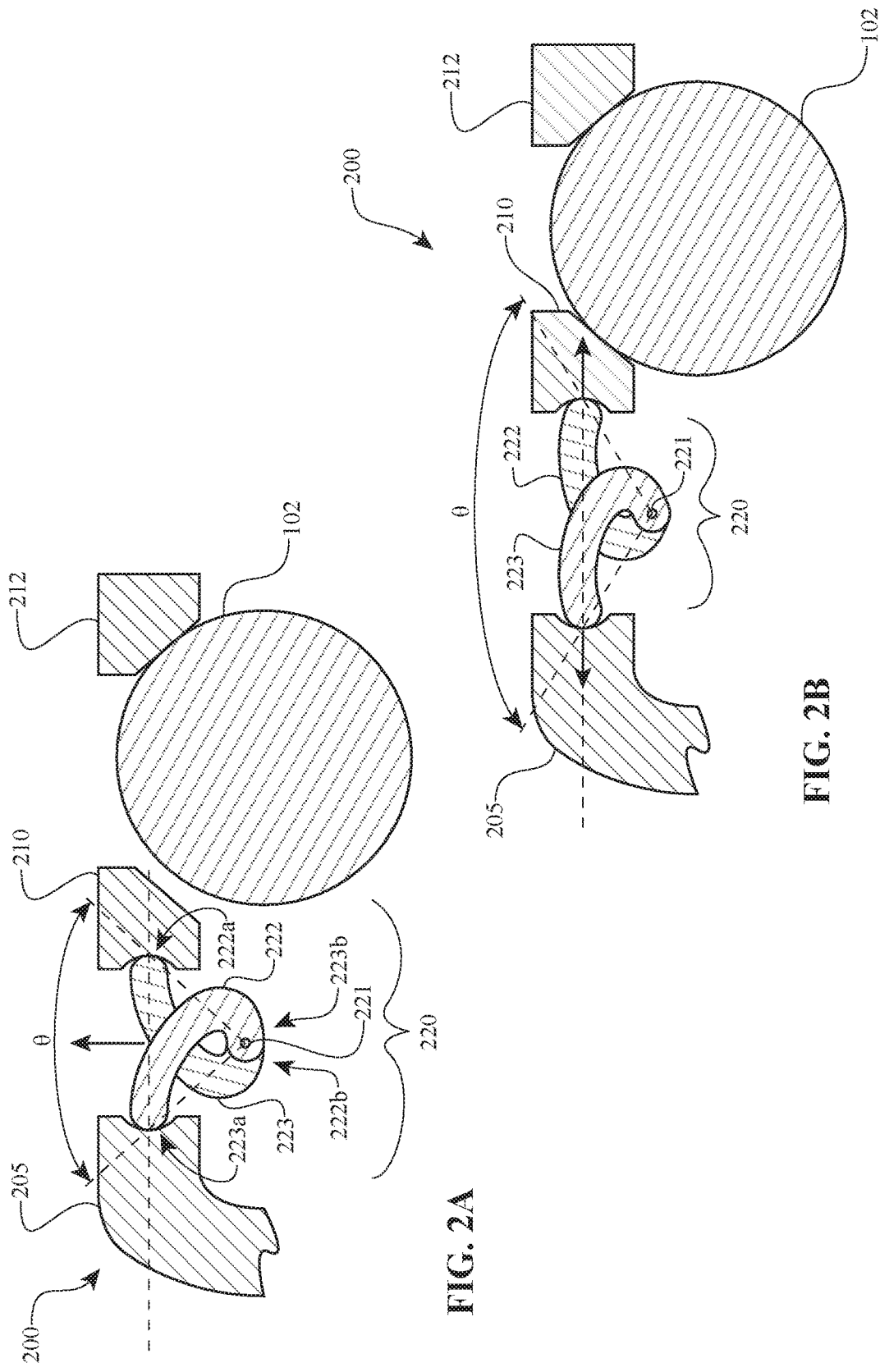

As depicted in FIGS. 2A and 2B, speed based AFG mechanism 220 comprises two rigid members 222, 223 movably coupled. A movable coupling of first and second rigid members 222, 223 may include a rotatable coupling, such as by hinge 221, or a slidable coupling (not shown). Speed based AFG 220 may be interposed between traction ring 210 and cam 205 such that a first end 222a of first rigid member 222 contacts traction ring 210 and a first end 223a of second rigid member 223 contacts cam 205. As depicted in FIG. 2A, when rotational speed is below a predetermined threshold, inertia is low and speed based AFG mechanism 220 may be configured to form a first angle (0) to provide a first axial force (including providing zero axial force). As rotational speed increases, the first ends 222a, 223a of first and second rigid members 222, 223 remain in contact with traction ring 210 and cam 205, while second ends 222b, 223b of first and second rigid members 222, 223 may translate or rotate radially outward until speed based AFG mechanism 220 is in a second configuration having a second angle theta (θ) as depicted in FIG. 2B to provide a second axial force greater than zero. The net effect of speed based AFG mechanism 220 may be to move ring 210 closer to ring 212 as illustrated in FIGS. 2A, 2B, or speed based AFG mechanism 220 may increase the axial force applied to maintain rings 210, 212 with a desired separation distance over a range of rotational speeds for preferred performance of a CVT.

As depicted in FIGS. 2A and 2B, first and second rigid members 222, 223 may have curved shapes. However, other curved, angular or straight designs may be utilized to achieve a desired mass, inertia, range of operation, axial force generation rate, or the like.

As depicted in FIGS. 3A and 3B, speed based AFG mechanism 320 comprises two rigid members 322, 323 movably coupled and positioned within third rigid member 330. A movable coupling of first and second rigid members 322, 323 may include a rotatable coupling, such as by hinge 321, or a slidable coupling (not shown). Speed based AFG mechanism 320 may be interposed between traction ring 310 and cam 305 such that a first end of first rigid member 322 contacts traction ring 310 and a first end of second rigid member 323 contacts cam 305. As depicted in FIG. 3A, when rotational speed is below a predetermined threshold speed, inertia is low, speed based AFG mechanism 320 is configured having a first angle (0) and any axial force is applied by third rigid member 330. As rotational speed increases, the first ends 322a, 323a of first and second rigid members 322, 323 remain in contact with traction ring 310 and cam 305, and second ends 322b, 323b of first and second rigid members 322, 323 may translate or rotate radially outward until speed based AFG mechanism 320 is in a second configuration having a second angle (θ) as depicted in FIG. 3B. The net effect of AFG mechanism 320 being in the second configuration may be to move ring 310 closer to ring 312 as illustrated in FIGS. 3A, 3B, or speed based AFG mechanism 320 may increase the axial force applied to maintain rings 310, 312 at a desired separation distance over a range of rotational speeds for preferred performance of a CVT.

FIGS. 4A-4D depict cross-section partial views of CVTs, illustrating embodiments of speed based AFG systems and mechanisms. CVT 400 having speed based AFG mechanism 420 may include first and second rigid members 422, 423 movably coupled via hinge 421. As depicted in FIGS. 4A-4D, axial force generation mechanism 420 may further include intermediate member 435 capable of axial translation within casing 440. Advantageously, these embodiments may allow an overall axial length of speed based AFG mechanism 420 to accommodate other geometry and constraints within a CVT, provide desired preloading on rings 410, 412 of CVT, or some other benefit. As depicted in FIG. 4C, CVT 400 may further include bearing 428 interposed between ring 410 and intermediate member 435, which is useful in reducing stress or wear on intermediate member 435 or ring 410. As depicted in FIG. 4D, CVT 400 may further include disc 429 interposed between ring 410 and intermediate member 435, which is useful in distributing forces exerted by intermediate member 435 on ring 410.

In some embodiments, intermediate member 435 or casing 440 may be formed from a different material than other elements of AFG mechanism 420. The selection or method of manufacture of intermediate member 435 or casing 440 may be based on one or more of operating speed, operating temperature, preferred inertia or inertia range, maximum axial load, minimum axial load, or the like. Other considerations may include material cost, tooling cost, method of manufacture, method of assembly, or the like.

Figure 5:
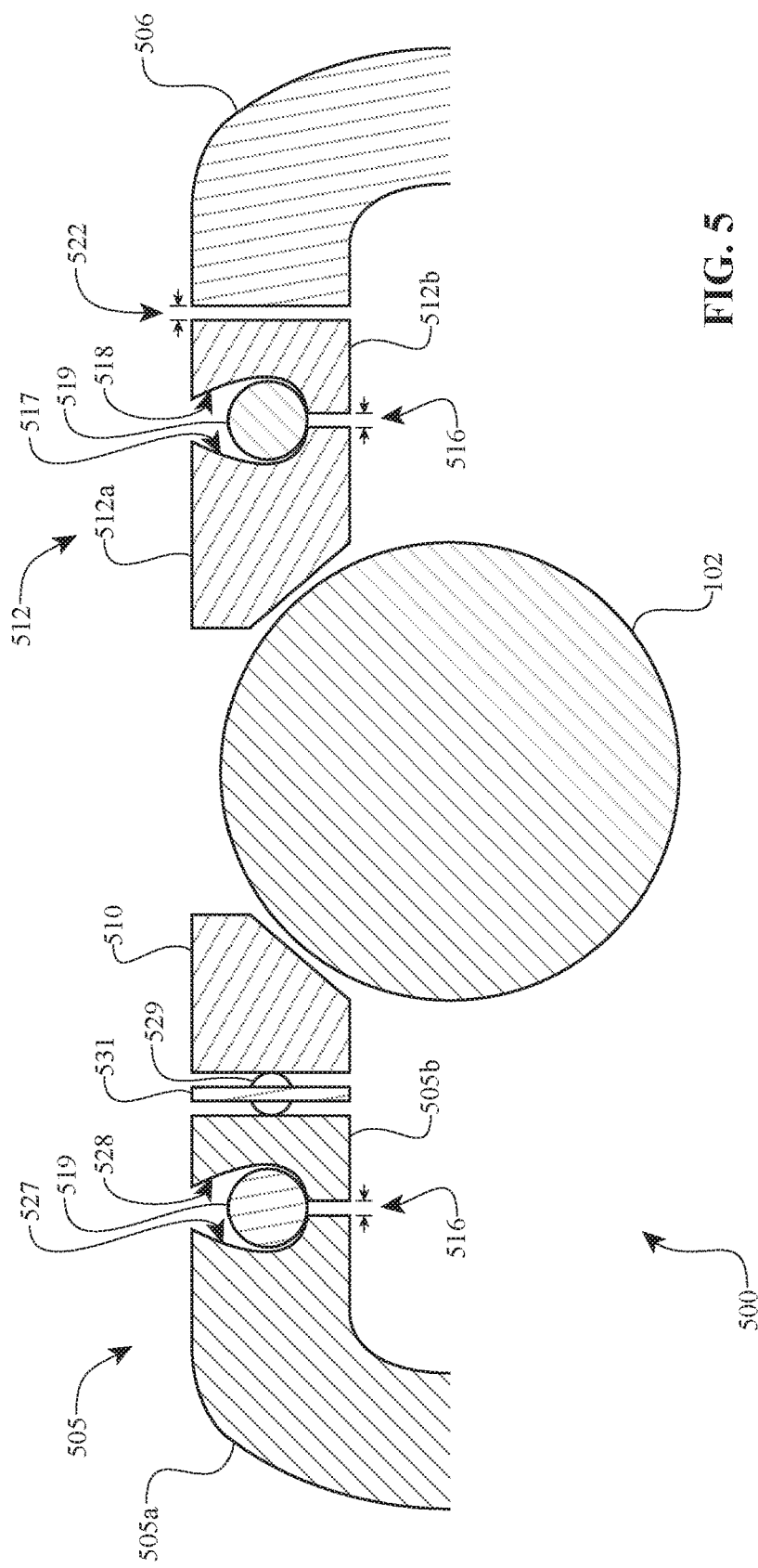

FIG. 5 depicts a cross-sectional partial view of a CVT, illustrating alternative embodiments of a speed based AFG based on geometry. As depicted on the left hand side of CVT 500 in FIG. 5, cam 505 may be formed with base portion 505a and transverse portion 505b. Interposed between base portion 505a and transverse portion 505b is rolling element 519. Furthermore, bearing 529 may be retained in disc 531. As depicted on the right hand side of CVT 500 in FIG. 5, ring 512 may be formed with first portion 512a and second portion 512b. Interposed between first portion 512a and second portion 512b is rolling element 519.

When rotation speeds are low, rolling elements 519 may be located radially inward. As rotation speeds increase, rolling elements 519 may move radially outward, applying force to surface 517 of first portion 512a and surface 518 of second portion 512b of ring 512 or surface 527 of base portion 505a and surface 528 of transverse portion 505b of cam 505. In particular, contact between rolling elements 519 and surfaces 517, 518 in ring 512 or surfaces 527, 528 of cam 505 may determine the axial force generated. Accordingly, the size number, weight and other characteristics of rolling elements 519, along with the shape, length, or other characteristic of surfaces 517, 518, 527 and 528 determine the axial force generated.

In some embodiments, cam 505 or ring 512 may further form part of a torque based AFG system in addition to forming part of a speed based axial force generation system.

In these embodiments, surfaces 517, 518, 52 may be configured for operation in a torque or speed regime. For example, cam 505 having surfaces 517, 518 may be configured such that rotation of first portion 505a relative to second portion 505b generates an axial force (i.e., when torque is applied to base portion 505a or transverse portion 505b), and may further be configured to generate an axial force when rotation speed of cam 505 increases. Similarly, ring 512 having surfaces 517, 518 may be configured such that rotation of first portion 512a relative to second portion 512b generates an axial force (i.e., when torque is applied to first portion 512a or second portion 512b), and may further be configured to generate an axial force when rotation speeds increase.

Embodiments disclosed herein may incorporate an axial force generation system in a ring. FIG. 6A depicts a top view of axial force generation system 600 formed with ring 630 integrated with a plurality of speed based axial force generation mechanisms 620 spaced angularly thereon, each speed based axial force generation mechanism 620 having a surface 623 for contact with a ring, cam, or other element. In some embodiments, speed based axial force generation mechanisms 620 may be radially located about a midline 608 of ring 630, or may be located radially inward or outward of midline 608.

The determination of radial positioning or angular placement of speed based axial force generation mechanisms 620 may be based on several factors. For example, positioning speed based axial force generation mechanisms 620 radially outward will tend to increase inertia, whereas positioning them radially inward will tend to decrease inertia. Other factors affecting the radial placement or angular positioning of speed based axial force generation mechanisms 620 include material of ring 630, overall weight, cost, tolerances or spatial constraints related to the positioning of ring 630 within a transmission or drive train, overall size constraint for a CVT or drive train, and the like.

Other considerations may include the properties or characteristics of a traction fluid used in the CVT. For example, if a traction fluid exhibits slip conditions at lower speeds, speed based axial force generation system 600 may need to generate larger axial forces at lower speeds. Similarly, if a CVT is operated at higher speeds and operates under higher temperature conditions that could result in slip or some other condition that negatively affects power capacity, speed based axial force generation system 600 may be configured based on the anticipated operating conditions to counteract the losses and improve power capacity.

FIG. 6B depicts a graph, illustrating axial force (N) generated by a speed based axial force generation mechanisms versus rotational speed (ω) for an operating range up to a maximum rotational speed 669. Speed based axial force generation system 600 may be selected based on the ability to provide a desired axial force applied via surfaces 623 of axial force generation mechanisms 620, and which does not exceed axial force upper limit 668, does not exceed a desired axial force per rotational speed upper limit 660 (also referred to as maximum axial force generation rate 660), or maintains at least a minimum desired axial force per rotational speed threshold 662 (also referred to as minimum axial force generation rate 662). In some embodiments, the size, number, or geometry of axial force generation mechanisms 620 in speed based axial force generation system 600 determines a minimum axial force and maximum axial force that can be generated, and may also determine the axial force generation rate. For example, in some embodiments, speed based axial force generation system 600 may be configured to provide a linearly increasing axial force generation rate 664, but in other applications, speed based axial force generation system 600 may be configured to generate axial forces at a non-linear axial force generation rate such as rate 663 in which the axial force generated per rotational speed increases (i.e., an increasing axial force generation rate) or axial force generation rate 661 in which the axial force generated per rotational speed decreases (i.e., a decreasing axial force generation rate). In other embodiments, speed based axial force generation system 600 may be configured to generate a stepped or otherwise discrete axial force generation rate. For example, embodiments of speed based axial force generation system 600 may generate an axial force according to a first axial force generation rate over a first portion of the operating range of a CVT and operate according to a second axial force generation rate over a second portion of the operating range. Either the first profile or the second axial force generation rate may be linear, constant, increasing, decreasing, or stepped.

Embodiments may be integrated with other axial force generation systems. FIG. 7A depicts a top view of axial force generation system 700 including ring 730 with speed based axial force generation mechanisms 720 and torque based axial force generation mechanisms 722.

FIG. 7B depicts a graph, illustrating operation of an axial force generation system utilizing a combination of torque based axial force generation mechanisms and speed based axial force generation mechanisms.

The determination of radial positioning or angular placement of speed based axial force generation mechanisms 720 may be based on several factors. For example, positioning speed based axial force generation mechanisms 720 radially outward will tend to increase inertia, whereas positioning them radially inward will tend to decrease inertia. Other factors affecting the radial placement or angular positioning of speed based axial force generation mechanisms 720 include material of ring 730, overall weight, cost, tolerances or spatial constraints related to the positioning of ring 730 within a transmission or drive train, overall size constraint for a CVT or drive train, and the like.

Similarly, the determination of radial positioning or angular placement of torque based axial force generation mechanisms 722 may be based on several factors. For example, positioning torque based axial force generation mechanisms 722 radially outward will generate lower axial forces as compared to positioning them radially inward. Other factors affecting the radial placement or angular positioning of torque based axial force generation mechanisms 722 include material of ring 730, overall weight, cost, tolerances or spatial constraints related to the positioning of ring 730 within a transmission or drive train, overall size constraint for a CVT or drive train, and the like.

Other considerations may include the properties or characteristics of a traction fluid used in the CVT. For example, if a traction fluid exhibits slip conditions at lower speeds, axial force generation system 700 may need to generate larger axial forces at lower speeds. Similarly, if a CVT is operated at higher speeds and operates under higher temperature conditions that result in slip or some other condition that negatively affects power capacity, axial force generation system 700 may be configured based on the anticipated operating conditions to counteract the losses and improve power capacity.

As depicted in FIG. 7B, axial forces generated by speed based axial force generation mechanisms 720 may differ from axial forces generated by torque based axial force generation mechanisms 722 with respect to magnitude and rate of generation. In particular, FIG. 7B illustrates a torque based AFG system axial force generation rate 770 and a speed based AFG system axial force generation rate 764. Regarding torque based AFG system axial force generation rate 770, the axial force generated is highest at low speeds and decreases at higher speeds. Regarding speed based AFG system axial force generation rate 764, the axial force generated is lowest at low speeds and increases at higher speeds.

Accordingly, the configuration of axial force generation systems having mechanisms 720, 722 may be selected to ensure a desired overall axial force is generated for a range of operating conditions. In other words, axial force generation system 700 may be configured such that torque based axial force generation mechanisms 722 are primarily responsible for generating axial forces at lower speeds, speed based axial force generation mechanisms 720 are primarily responsible for generating axial forces at higher speeds, and the two axial force generation mechanisms 720, 722 are complementary and jointly responsible for generating axial forces at intermediate rotational speeds. In this setup, a preload on torque based axial force generation mechanisms 722 can be smaller, avoiding over constraining of AFG system 700 and allowing a CVT to operate at higher efficiency, lower operating temperature, or increased power capacity, have increased component life, or some other benefit. Speed based axial force generation mechanisms 720 may be configured to generate axial forces to exceed minimum axial force generation rate 762 but not exceed maximum axial force generation rate 761. Similarly, torque based axial force generation mechanisms 722 may be configured to generate axial forces greater than a minimum axial force generation rate 765 up to a maximum rotational speed 769.

Figure 8:
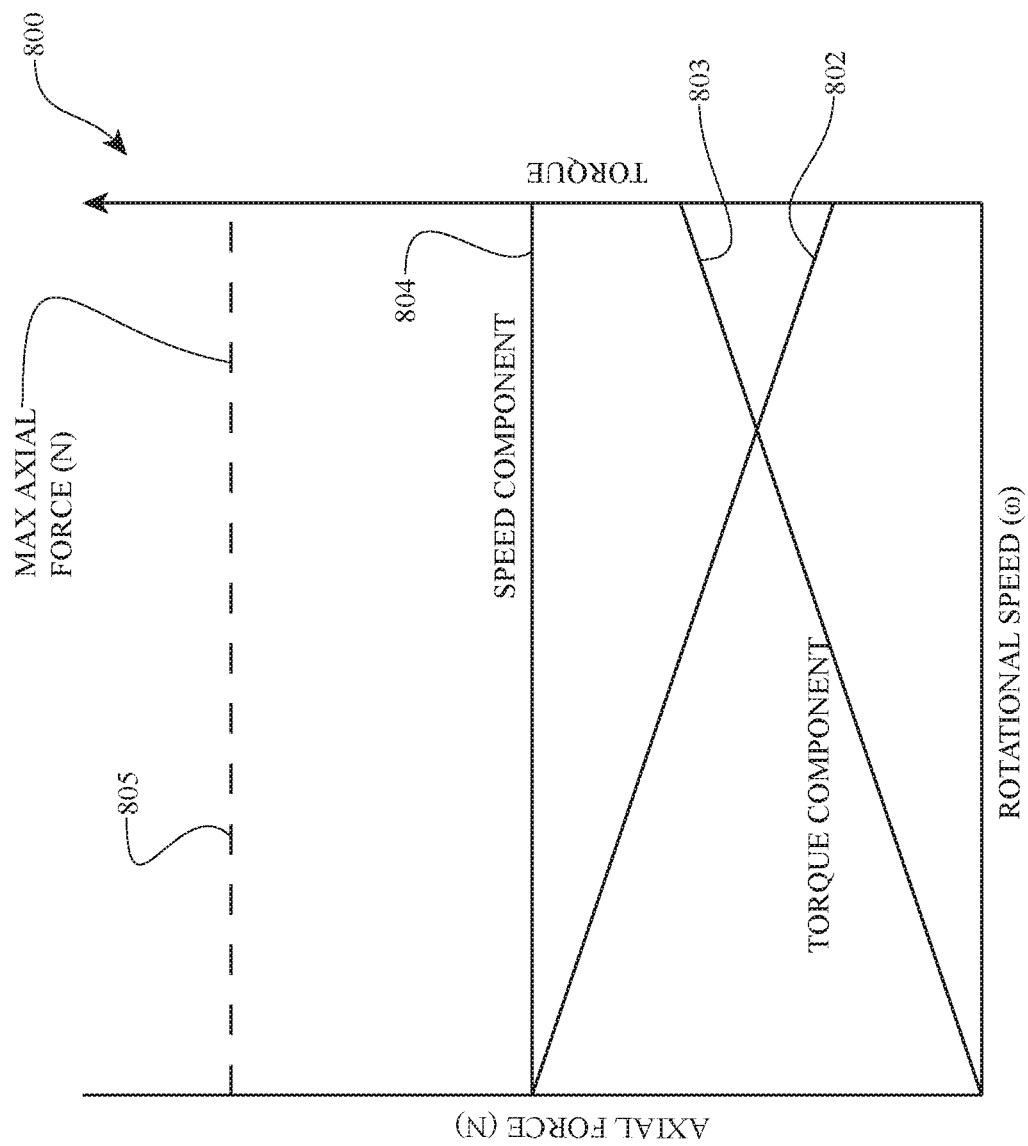
FIG. 8 depicts a graph illustrating axial force generation as a function of speed-based and torque-based axial force generation regimes.

FIG. 8 depicts a graph, illustrating one embodiment for using a speed based axial force generation system in combination with a torque based axial force generation system. As depicted in FIG. 8, when rotational speed is low, speed based axial force generation systems (such as speed based axial force generation system 600 described above) may provide a first axial force according to a first axial force generation rate 803 and torque based axial force generation systems (such as torque based axial force generation system 700) may provide a second axial force according to a second axial force generation rate 802. The axial force generation systems 600, 700 may operate in parallel or may combine to result in combined axial force generation rate 804 up to maximum axial force generation rate 805.

The foregoing disclosure details certain embodiments. It will be appreciated, however, that no matter how detailed the foregoing appears in text, the features and concepts of the disclosure can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. Furthermore, the disclosure includes embodiments in which the entire drive is rotating as well as embodiments in which carriers used to control a skew angle of the planets may rotate relative to each other (e.g., a beta angle of up to degrees) but are essentially stationary.

The embodiments described herein are not intended to limit the scope of the disclosure, but are instead provided as examples for those of skill in the art to more easily ascertain inventive features and elements disclosed herein.

I claim:

1. A speed based axial force generation mechanism formed in a ball-planetary continuously variable transmission comprising a plurality of planets interposed between and in contact with a first traction ring, a second traction ring, and a sun, the speed based axial force mechanism comprising:
   a first rigid member comprising a first end and a second end, the first rigid member located proximate to and with the first end in contact with the first traction ring; and
   a second rigid member comprising a first end and a second end, the second rigid member located proximate to and with the first end in contact with a cam; and
   a movable coupling configured to couple the second end of the first rigid member to the second end of the second rigid member, wherein the first rigid member and the second rigid member are in a first configuration when the axial force generation system is rotating about a central axis at a first rotational speed, wherein the movable coupling is radially inward of the first end of the first rigid member and the first end of the second rigid member, wherein the first rigid member and the second rigid member change to a second configuration at a second rotational speed greater than the first rotational speed, wherein the movable coupling moves radially outward at the second rotational speed, and wherein a compression force is generated at the second configuration.

2. The speed based axial force generation mechanism of claim 1, wherein one or more of the length of the first rigid member, the length of the second rigid member, the mass of the first rigid member, the mass of the second rigid member, a profile of the first rigid member, and a profile of the second rigid member is selected to generate a first axial force at a first angle and a second axial force at a second angle, according to one of a linear, an increasing, and a decreasing axial force generation rate.

3. The speed based axial force generation mechanism of claim 2, wherein the movable coupling comprises a hinge coupling, wherein the second configuration comprises the first rigid member and the second rigid member rotating about the hinge coupling to form an angle less than or equal to 180 degrees.

4. An axial force generation system formed in a ball-planetary continuously variable transmission comprising a plurality of planets interposed between and in contact with a first traction ring, a second traction ring, and a sun, the axial force generation system comprising:
   a casing;
   an intermediate member axially translatable within the casing;
   a first rigid member comprising a first end and a second end, the first rigid member located proximate to and with the first end in contact with the intermediate member; and
   a second rigid member comprising a first end and a second end, the second rigid member located proximate to and with the first end in contact with a cam; and
   a movable coupling configured to couple the second end of the first rigid member to the second end of the second rigid member, the first rigid member having the first end shaped for contact with the intermediate member and the second rigid member having the first end shaped for contact with the cam, wherein the first rigid member and the second rigid member are in a first configuration at a first angle when the speed based axial force generation mechanism is rotating about a central axis at a first rotational speed, wherein the speed based axial force generation mechanism is in a second configuration at a second angle greater than the first angle when the speed based axial force generation mechanism rotates about the central axis at a second rotational speed greater than the first rotational speed, and wherein a first axial force is generated on the intermediate member in contact with the first traction ring and the cam in the first configuration and a second axial force is generated on the intermediate member in contact with the first traction ring and the cam in the second configuration.

5. The system of claim 4, wherein the movable coupling comprises a hinge coupling, and wherein the second configuration comprises the first rigid member and the second rigid member rotating about the hinge coupling to form an angle less than or equal to 180 degrees.

6. The system of claim 4, further comprising a bearing or disc between the intermediate member and the first traction ring.

7. The system of claim 4, wherein the casing is coupled to the cam via a third rigid member.

8. The system of claim 4, wherein one or more of the length of the first rigid member, the length of the second rigid member, the mass of the first rigid member, the mass of the second rigid member, a profile of the first rigid member, and a profile of the second rigid member is selected to generate a first axial force at the first angle and a second axial force at the second angle, according to one of a linear, an increasing, and a decreasing axial force generation rate.

9. The system of claim 4, wherein the movable coupling comprises a hinge coupling, and wherein the second configuration comprises the first rigid member and the second rigid member rotating about the hinge coupling to form an angle less than or equal to 180 degrees.

* * * * *